United States Patent Office 3,595,675
Patented July 27, 1971

3,595,675
GELATIN COMPOSITION
Kenneth Owen Ash, Minneapolis, and George Christianson, Wayzata, Minn., assignors to General Mills, Inc.
Filed Nov. 21, 1966, Ser. No. 595,628
Int. Cl. A23l 1/04
U.S. Cl. 99—130                    8 Claims

ABSTRACT OF THE DISCLOSURE

Compositions comprising cold water soluble gelatin particles and spun sugar particles with the sugar particles being present in an amount of at least about two parts by weight for each part of the gelatin particles.

---

The present invention relates to a gelatin composition and more particularly to a gelatin composition which readily dissolves in cold water and is suitable for use in powdered gelatin-containing dessert mixes and the like.

Conventional commercially available containing powders must be dissolved in hot water and stored in a refrigerator or cooled until the resulting solution sets to a gel. It takes several hours to obtain a servable gel product from such compositions. The time can be shortened somewhat by providing a portion of the water content in the form of ice cubes which are added after dissolving the gelatin in hot water.

There has been a continuing effort made to produce powdered gelatin compositions which are soluble in cold water and yet set up to form a firm gel. Such a product would provide many advantages to the ultimate user. A truly cold water soluble gelatin would eliminate the need for hot water. And since the gel solution is already relatively cold, the gel time would be shortened considerably. In addition, the use of hot water often has an adverse effect on flavoring constituents found in the powdered gelatin containing compositions.

In recent times it has been said that cold water soluble gelatin composition could be prepared by dissolving about one part gelatin and nine parts sugar in ten parts hot water and then drying the solution as a thin film. The drying could be accomplished on a drum drier. While this product is disclosed as being cold water soluble, little flexibility is available in the ratio of ingredients. Thus the product is relatively highly sweetened when the commonly employed sucrose is used as the sugar ingredient. It is often desired to prepare gelled products, such as various salads, which are not highly sweetened.

Gelatin per se has also been modified in various ways to allegedly produce cold water soluble products. However, to the best of our knowledge these products have met with limited success because of the difficulty encountered in wetting the modified gelatins. Only with vigorous mixing and considerable patience could the clumps of the modified gelatins be broken up and dissolved.

Accordingly, it is an object of our invention to provide a novel cold water soluble gelatin composition. Another object of the invention is to provide such a product wherein the gelatin-sugar ratio can be varied over relatively wide limits. These and other objects will become apparent from the following detailed description.

We have now discovered valuable gelatin compositions comprising cold water soluble gelatin particles and spun sugar particles. The new compositions of our invention are readily soluble in cold water and the resulting solutions set to a gel in a relatively short period of time. Additionally, the sugar:gelatin weight ratio in our compositions can vary from as low as about 2:1 to 10:1 and higher. Thus our compositions find use in dessert preparations as well as in numerous other formulations where high sweetness is not desired.

The gelatin constituent of our compositions is preferably prepared by drum drying a hot solution of unmodified gelatin. Thus any commercially available unmodified gelatin may be dissolved in hot water (i.e. about 120–212° F.) at preferred concentrations of about 5 to 40% by weight and the resulting solution is then drum dried. The dried gelatin film is scraped from the rolls of the drier and the flakes are reduced in particle size. The drum dried gelatin particles preferably pass through a No. 30 wire screen and are retained on a No. 200 wire screen. Thus the particles preferably have an average cross-section of about 70 to 600 microns. As a further feature of our invention, it has been found that gelatin particles which pass through a No. 50 wire screen and are retained on a No. 70 wire screen give especially outstanding results when mixed with spun sugar particles. Thus such compositions dissolve in cold water almost instantaneously and the resulting solutions and gels contain virtually no undissolved gelatin particles. The gelatin particles should have a cross-section of at least about 25 microns since particles smaller than this have a tendency to clump even in the presence of relatively large amounts of spun sugar particles.

Any sugar which can be spun is useful in preparing the compositions of the present invention. Sucrose is the preferred sugar. The spinning of the sugar can be accomplished in the readily available candy floss machine. Thus the sugar is continuously melted in a centrally disposed disk having small openings on the outer perimeter. The disk is rotated in such a manner that the melted sugar is forced out of the openings into a cooler atmosphere where the sugar solidifies in the form of fibers. The fibers are collected in an outer circular chamber and preferably pulled from such chamber by the use of vacuum through an opening in such outer chamber. The fibers are then broken up into short lengths by the use of any suitable apparatus such as a hammer mill, Hobart mixer and the like. The resulting particles are actually short "rods" which may be of essentially the same general size range as the gelatin particles although this is not necesary. Preferably, the ground fibrous sugar particles have a diameter in the range of from about 3 to 12 microns and a length of about 25 to 300 microns. In the examples to follow the sugar particles had an average diameter of about 5 microns and an average length of about 75 microns.

Our compositions are prepared by simply blending the cold water soluble gelatin particles with the spun sugar particles to produce a relatively homogeneous admixture. It is also understood that if desired the particle size of both the gelatin particles and the fibrous sugar particles can be reduced during the blending operation.

Our compositions find particular use in the preparation of desserts, salads, other gelled food products and the like. Various flavoring and coloring agents, acidulents and the like may be added to such compositions to provide the housewife or other user with a complete dessert mix etc. To produce gelled products, our compositions can be mixed with water and then refrigerated. To produce foamed products, our compositions can be mixed with water, whipped and then refrigerated. Gelled products are normally prepared by using the composition and water in amounts such that the resulting solution prior to being gelled will contain about 1.53–3.0% gelatin. Foam products generally require about 4–6% gelatin based on the amount of water.

The following examples serve to illustrate certain preferred embodiments of the invention without being limiting.

EXAMPLE I

Four hundred grams commercial gelatin (Calfskin gelatin—Grayslake) was dissolved in 1600 ml. hot water (about 140° F.) to give a 20% gelatin solution. This solution was drum dried with 50 lbs. steam pressure inside the rolls. The dried gelatin was scraped from the rolls and the resulting voluminous flakes were broken up in a Hobart mixer. Particles of spun sucrose were mixed with the particles of drum dried gelatin in the Hobart mixer. The weight ratio of the spun sugar to the gelatin was 8:1. A 22.5 g. portion of the composition was placed in a glass beaker and 100 ml. water at 75° F. was added. The mixture was stirred for one minute using a stirring rod and the resulting solution was refrigerated for one hour. The gel was set after the refrigeration period. It was clear with very few particles (4–6) remaining on the top surface thereof.

EXAMPLE II

Example I was repeated except that the water and gelatin-sugar blend was mixed using wrist action shaking in a closed container for 15 seconds. Substantially the same excellent results were obtained and the resulting clear gel had only two visible small particles on the surface thereof.

EXAMPLE III

A dessert mix was prepared from 90 g. of the drum dried gelatin-spun sugar mixture of Example I, 2.48 g. citric acid hydrate, 0.22 g. $NaH_2PO_4$, 0.22 g. $Na_2HPO_4$, 0.5 g. imitation raspberry flavor and 0.1 g. red coloring. A 23.2 g. portion of this mix was added to a container along with 100 ml. water at 75° F. The resulting blend was mixed by shaking the closed container for 15 seconds. The solution was refrigerated for 1 hour to yield a firm gel having good consistency and appearance.

EXAMPLE IV

Example II was essentially repeated using various crystalline sugars in place of the spun sucrose. Regular granulated sucrose yielded a weak gel having a heavy particle layer on the surface. C & H frosting sugar yielded a relatively weak gel having a tough particle layer on the surface. The use of sucrose ground on a Raymond mill (12/12 whizzer and 8/8 whizzer settings—2% starch as grinding aid) yielded gels which were opaque and had particle layers on the surfaces thereof. In all cases the gels were weaker than the gel of Example II. In addition, attempts to dissolve the drum dried gelatin per se (2.5 g. in 100 ml. water at 75° F.) were unsuccessful. Thus the unground gelatin (closed container—high speed wrist action shaker for one minute) yielded a weak gel containing many undissolved particles. Severe clupming was encountered under the same conditions using ground drum dried gelatin. Large gel particles were formed in the liquid and the same did not set up to any appreciable degree.

EXAMPLE V

Example I was essentially repeated except:
(1) The drum dried gelatin was ground and screened to the following particle sizes Sample:
- A _____. Retained on No. 50 wire.
- B _____. Passed No. 50/retained on No. 70 wire.
- C _____ Passed No. 70/retained on No. 100 wire.
- D _____ Passed No. 100/retained on No. 140 wire.
- E _____ Passed No. 140/retained on No. 200 wire.
- F _____ Passed No. 200 wire.

(2) The spun sugar:drum dried gelatin weight ratio was 4:1 (25 grams of the mixture used with 200 ml. water);
(3) The water and the sugar:gelatin blend was stirred in a small bowl with a fork for one minute; and
(4) The resulting solutions were refrigerated for 2½ hours.

All samples dissolved readily and yielded gels which were clear and of good strength. Sample B was the best yielding a gel having the highest gel strength. There were substantially no undissolved particles observable in any of the gels. Use of water having a temperature of 59° F., 50° F., and 41° F. in place of the 75° F. water yielded gels of good properties although the gel strength decreased as the temperature of the dissolving water was lowered. Also, more particles of undissolved material were observable as the temperature was lowered. Samples A and F yielded gels having the most observable particles and relatively low gel strength indicating that with the use of water at 41° F. the particle size of the drum dried gelatin should be near that of Sample B and/or that at the lower water temperatures more spun sugar particles are required.

EXAMPLE VI

Durm dried gelatin prepared as in Example I was ground and screened to yield a sample which passed through a No. 40 wire and was retained on a No. 62 wire. Two and one-half gram samples of the ground and sized gelatin were mixed with 20, 15, 10 and 5 gram portions of spun sucrose particles.

One hundred milliliters of water at 75° F. were added to each blend over a 15 second period while stirring with a fork and the stirring was continued for an additional 15 seconds. The resulting solutions were then refrigerated. In all cases clear gels having good gel strengths were obtained. As the sugar:gelatin ratio was reduced to 2:1 some undissolved particles were observable in the gel surfaces. However, even at the 2:1 ratio, there were not enough undissolved particles to detract from the over-all quality of the gel. In contrast, when 2.5 grams of the gelatin particles alone were used, the resulting refrigerated product was not suitable due to the large number of undissolved particles and the very low gel strength of the product (the stirring was even continued for an additional 30 seconds an attempt to affect dissolution of the clumped gelatin particles). The use of 20 grams of ground crystalline sucrose (Raymond mill—12/12 whizzer setting) with 2.5 grams of the drum dried gelatin also yielded a product having many more undissolved particles than the sample using 20 grams of spun sugar particles. This was true even though the sample was stirred for an additional 30 seconds.

As indicated above, the compositions of our invention find particular use in the preparation of desserts. They also find use in the preparation of salads and the like. The compositions can be added to orange juice and then refrigerated to yield a delectable gelled product. If more of such compositions are added to liquids including orange juice, the resulting solutions can be whipped to a stable foam and fruit pieces such as fruit cocktail, can be added to the foam. The refrigerated foam represents a light, airy product which finds use as a dessert, salad or the like. Cold liquids facilitate the whipping of the compositions and the foams set up in as short a time as 15–30 minutes. Our compositions can also be added to buttermilk and then refrigerated to yield a product resembling cream cheese. In the examples above, our compositions were added to water and mixed with same by various techniques. It is preferred to use a stirring technique, preferably with a fork, for short periods of time. Shaking of the blend often yields a foam which detracts from the appearance of the resulting gel. Of course, a small amount of known anti-foam agent effectively reduces such foams. Additionally, the foam can be readily skimmed from the surface of ungelled or gelled product. It is also preferred to mix our compositions with water having a temperature of 50–80° F. However, colder water can be used with good results, especially at the higher spun sugar:gelatin ratios. Our compositions will quickly dissolve in hot water but the gelation time of the resulting solutions will be increased. Thus there is no advantage in using water having a temperature much above ambient room temperature.

Although this invention has been described with reference to certain specific embodiments, it will be apparent to those skilled in the art that various modifications and changes may be made thereto.

The embodiments of the invention in which an exclusive property or privilege is claimed are defined as follows:

1. A dry composition comprising cold water soluble gelatin particles and spun sugar particles, said sugar particles being present in an amount of at least about two parts by weight for each part of the gelatin particles.

2. The composition of claim 1 wherein the sugar and gelatin are present in a weight ratio of 2:1 to 10:1.

3. The composition of claim 1 wherein the sugar and gelatin are present in a weight ratio of 8:1.

4. The composition of claim 1 wherein the sugar and gelatin are present in a weight ratio of 4:1.

5. The combination of claim 1 wherein the cold water soluble gelatin is drum dried gelatin.

6. The composition of claim 1 wherein the gelatin particles have an average cross-section of from about 70 to 600 microns.

7. The composition of claim 1 wherein the spun sugar is spun sucrose.

8. The composition of claim 1 wherein the gelatin particles and the sugar particles are of approximately the same size.

References Cited
UNITED STATES PATENTS

| | | | |
|---|---|---|---|
| 2,948,622 | 8/1960 | Cahn | 99—130 |
| 3,221,675 | 12/1965 | Forkner | 99—134UX |

RAYMOND N. JONES, Primary Examiner

J. M. HUNTER, Assistant Examiner